(12) United States Patent
An et al.

(10) Patent No.: US 12,122,441 B2
(45) Date of Patent: Oct. 22, 2024

(54) ELECTRIC HANDCART

(71) Applicant: Techtronic Cordless GP, Anderson, SC (US)

(72) Inventors: Wei Wei An, Dongguan (CN); Da Zheng Li, Dongguan (CN)

(73) Assignee: TECHTRONIC CORDLESS GP, Anderson, SC (US)

(*) Notice: Subject to any disclaimer, the term of this patent is extended or adjusted under 35 U.S.C. 154(b) by 97 days.

(21) Appl. No.: 17/774,938

(22) PCT Filed: Nov. 8, 2019

(86) PCT No.: PCT/CN2019/116703
§ 371 (c)(1),
(2) Date: May 6, 2022

(87) PCT Pub. No.: WO2021/087983
PCT Pub. Date: May 14, 2021

(65) Prior Publication Data
US 2022/0289263 A1 Sep. 15, 2022

(51) Int. Cl.
*B62B 5/00* (2006.01)
*B62B 5/04* (2006.01)

(52) U.S. Cl.
CPC .......... *B62B 5/0066* (2013.01); *B62B 5/0053* (2013.01); *B62B 5/0069* (2013.01); *B62B 5/0438* (2013.01)

(58) Field of Classification Search
CPC ... B62B 5/0066; B62B 5/0053; B62B 5/0069; B62B 5/0438; B62B 5/0046; B62B 2005/0471; B62B 1/002; B60T 13/74
See application file for complete search history.

(56) References Cited

U.S. PATENT DOCUMENTS

| 6,173,799 | B1 | 1/2001 | Miyazaki |
| 6,328,319 | B1* | 12/2001 | Stahler, Sr. ............... B62B 1/12 280/47.27 |
| 6,470,981 | B1 | 10/2002 | Sueshige |
| 6,481,518 | B1 | 11/2002 | Wu |
| 6,588,775 | B2* | 7/2003 | Malone, Jr. ............. B62B 1/002 280/47.27 |
| 6,755,284 | B2* | 6/2004 | Revelis ................. B60T 13/746 188/73.1 |
| 7,163,213 | B2* | 1/2007 | Chambers ............ B62D 51/001 180/209 |

(Continued)

FOREIGN PATENT DOCUMENTS

| CA | 2210037 C | 1/1998 |
| CA | 2758925 C | 10/2010 |

(Continued)

OTHER PUBLICATIONS

Chinese Office Action Corresponding with Application No. 201980097427.9 on Mar. 8, 2023 (2 pages).

(Continued)

*Primary Examiner* — Steve Clemmons
(74) *Attorney, Agent, or Firm* — Dority & Manning, P.A.

(57) ABSTRACT

An electric handcart, comprising: a main body (1), a power supply device (9) mounted on the main body (1), a power device, and a control device. The power supply device (9) and the control device are separately connected to the power device.

19 Claims, 9 Drawing Sheets (56) References Cited

U.S. PATENT DOCUMENTS

| | | | |
|---|---|---|---|
| 7,775,306 B1 | 8/2010 | Adkins | |
| 8,235,153 B2 | 8/2012 | Robinson | |
| 8,851,215 B2 | 10/2014 | Goto | |
| 8,997,903 B2 | 1/2015 | Vandelinde | |
| 9,120,657 B1* | 9/2015 | Turner | B62B 5/0056 |
| 9,636,992 B2 | 5/2017 | Biderman | |
| 10,099,732 B2 | 10/2018 | Ho | |
| 2004/0017058 A1 | 1/2004 | Hargroder | |
| 2007/0079998 A1 | 4/2007 | Walter | |
| 2007/0089917 A1 | 4/2007 | Hartley | |
| 2012/0025482 A1 | 2/2012 | Wyse et al. | |
| 2016/0107671 A1 | 4/2016 | Wyse et al. | |
| 2021/0039697 A1* | 2/2021 | Shibata | B62B 5/0414 |

FOREIGN PATENT DOCUMENTS

| | | | | |
|---|---|---|---|---|
| CN | 201102558 Y | | 8/2008 | |
| CN | 201545042 U | | 8/2010 | |
| CN | 102372052 A | | 3/2012 | |
| CN | 102582667 A | | 7/2012 | |
| CN | 202389431 U | | 8/2012 | |
| CN | 202481122 U | | 10/2012 | |
| CN | 202686398 U | | 1/2013 | |
| CN | 203318448 U | | 12/2013 | |
| CN | 103612656 A | | 3/2014 | |
| CN | 203485940 U | * | 3/2014 | |
| CN | 203558114 U | | 4/2014 | |
| CN | 203832543 U | | 9/2014 | |
| CN | 204296844 U | | 4/2015 | |
| CN | 204674619 U | | 9/2015 | |
| CN | 105346579 A | * | 2/2016 | B62B 3/08 |
| CN | 205220743 U | * | 5/2016 | |
| CN | 205327129 U | | 6/2016 | |
| CN | 205469130 U | | 8/2016 | |
| CN | 106043586 A | | 10/2016 | |
| CN | 107082076 A | | 8/2017 | |
| CN | 206544538 U | | 10/2017 | |
| CN | 206766051 U | | 12/2017 | |
| CN | 107539339 A | | 1/2018 | |
| CN | 207274759 U | | 4/2018 | |
| CN | 108001492 A | | 5/2018 | |
| CN | 108100005 A | | 6/2018 | |
| CN | 207449936 U | | 6/2018 | |
| CN | 108357521 A | | 8/2018 | |
| CN | 208102029 U | | 11/2018 | |
| CN | 208181105 U | | 12/2018 | |
| CN | 208325266 U | | 1/2019 | |
| CN | 208360259 U | | 1/2019 | |
| DE | 10008451 A1 | | 8/2001 | |
| DE | 202004015048 U1 | | 11/2004 | |
| DE | 202012003450 U1 | | 5/2012 | |
| DE | 202012009715 U1 | | 11/2012 | |
| DE | 202015001334 U1 | | 3/2015 | |
| DE | 102015002169 A1 | | 8/2016 | |
| EP | 2977292 B1 | | 1/2016 | |
| FR | 2851544 A1 | | 8/2004 | |
| FR | 3063963 A1 | | 9/2018 | |
| JP | S63125472 A | * | 5/1988 | |
| JP | H11146508 A | * | 5/1999 | |
| JP | 2003011825 A | | 1/2003 | |
| JP | 2006082792 A | | 3/2006 | |

OTHER PUBLICATIONS

Chinese Office Action Corresponding with Application No. 201980097773.7 on Mar. 4, 2023 (1 page).

European Search Report Corresponding with Application No. EP19952888 on Jul. 3, 2023 (1 page).

European Search Report Corresponding with Application No. EP19951958 on Jul. 8, 2023 (1 page).

Canadian Office Action Corresponding with Application No. 3,157,247 on Jul. 19, 2023 (1 page).

International Search Report corresponding to Application No. PCT/CN2019/116703 on Jul. 10, 2020 (2 pages).

* cited by examiner

ELECTRIC HANDCART

PRIORITY CLAIM

This application is a National Stage Patent Application of PCT/CN2019/116703, filed on Nov. 8, 2019, the disclosure of which is incorporated by reference herein in its entirety.

TECHNICAL FIELD

The present disclosure relates to the technical field of handcarts, and in particular to an electric handcart.

BACKGROUND ART

Handcarts are a common means of transportation, being widely used in all aspects of production and life, e.g. warehousing and construction, etc. Traditional manual handcarts rely on manpower to be pulled or pushed, so labor intensity is high, and work efficiency is low. Electric handcarts emerged in response to this situation. A drive motor supplies motive power to the handcart, and a clutch in the electric handcart is generally controlled by the drive motor, to achieve switching between electric and manual modes of the handcart.

However, in existing electric handcarts, mechanical brakes that require manual activation are usually used. The braking time is long and the braking force is small; as a result, when loaded with a heavy object, the electric handcart is not very safe during braking.

SUMMARY OF THE INVENTION

The present disclosure provides an electric handcart. The electric handcart comprises: a main body, a power supply device mounted on the main body, a motive power device and a control device, the power supply device and the control device being separately connected to the motive power device.

Optionally, the main body comprises a frame on which the power supply device, the motive power device and the control device are mounted, and multiple wheels which carry the frame.

Further optionally, the motive power device comprises a driving device, a transmission device connected to the driving device, a clutch device connected to the transmission device, and a braking device; the wheels are separately connected to the transmission device and the braking device, and the control device is separately connected to the driving device and the braking device.

Further optionally, the braking device comprises a brake/clutch motor, a cam, a brake line, a braking part, and a brake disk which acts on at least one of the wheels; an output shaft of the brake/clutch motor is connected to the cam, the cam is connected to the braking part via the brake line, and the clutch device is connected to the cam.

Further optionally, the clutch device comprises a clutch control rod, a clutch driving lever and a clutch body; one end of the clutch control rod is connected to the cam, the other end of the clutch control rod is connected to one end of the clutch driving lever, the other end of the clutch driving lever is connected to the clutch body, and the clutch body is connected to the transmission device.

Optionally, the transmission device is a differential transmission device.

Further optionally, the differential transmission device comprises a first-stage transmission gear connected to a drive motor in the driving device, a second-stage transmission gear meshed with the first-stage transmission gear, a first rotation shaft with the second-stage transmission gear mounted on one end thereof, a second rotation shaft with one end connected to the other end of the first rotation shaft via the clutch device, a third-stage transmission gear mounted on the other end of the second rotation shaft, a fourth-stage transmission gear meshed with the third-stage transmission gear, and a drive shaft on which the fourth-stage transmission gear is mounted; wherein the wheels are mounted on two ends of the drive shaft respectively.

Optionally, the transmission ratio of the differential transmission device is 1:3.

Optionally, the power supply device comprises an upper housing and a lower housing; the lower housing is mounted on the main body in a fixed manner, and the upper housing is detachably connected to the lower housing.

Further optionally, a sealing ring is provided between the lower housing and the upper housing.

Optionally, the control device comprises a controller for controlling the motive power device, and a switch device connected to the controller.

Further optionally, the switch device comprises: a power supply membrane switch for controlling the switching of a power supply of the electric handcart on or off, a brake switch, a motor adjustment switch for adjusting motor operation when the power supply is switched on, a direction adjustment membrane switch for controlling the advance or retreat of the electric handcart, and a speed adjustment membrane switch for adjusting the movement speed of the electric handcart.

Further optionally, a handle is provided on the main body, and the switch device is arranged on the handle.

Further optionally, the power supply membrane switch is arranged on an end face of a first end of the handle, the brake switch is arranged on an inner side of the first end, the motor adjustment switch is arranged on an inner side of a second end of the handle, and the direction adjustment membrane switch and the speed adjustment membrane switch are arranged on an end face of the second end.

BRIEF DESCRIPTION OF THE DRAWINGS

In order to illustrate the technical solution in the present disclosure more clearly, a brief description is given below of drawings which need to be used in some embodiments of the present disclosure. As will be obvious, the drawings in the description below are merely some embodiments of the present disclosure. Other drawings could be obtained on the basis of these drawings by those skilled in the art.

REFERENCE LABELS

1—main body; 2—handle; 3—driving device;
31—drive motor; 4—transmission device; 41—first-stage transmission gear;
42—second-stage transmission gear; 43—first rotation shaft; 44—second rotation shaft;
45—third-stage transmission gear; 46—fourth-stage transmission gear; 47—drive shaft;
5—clutch device; 51—clutch control rod; 52—clutch driving lever;
53—clutch body; 6—wheels; 61—drive wheels;
62—auxiliary wheels; 7—braking device; 71—brake/clutch motor;
72—cam; 73—brake line; 74—braking part;
75—brake disk; 8—switch device; 81—power supply membrane switch;
82—brake switch; 83—motor adjustment switch; 84—direction adjustment membrane switch;
85—speed adjustment membrane switch; 9—power supply device; 91—upper housing;
92—lower housing; 10—support; 11—main frame;
12—auxiliary frame; 13—connecting member; 14—fixing shaft;
15—engagement slot; 16—one-way snap-fit connector.

DETAILED DESCRIPTION OF EMBODIMENTS

The technical solution in some embodiments of the present disclosure will be described clearly and completely below in conjunction with the accompanying drawings. Obviously, the described embodiments are only some of the embodiments of the present disclosure, rather than all of the embodiments. All other embodiments obtained by those of ordinary skill in the art based on the embodiments provided in the present disclosure fall within the scope of protection of the present disclosure.

It must be explained that the orientations or positional relationships indicated by terms used in the description of the structure of devices and components, such as "upper", "lower", "front", "rear", "left", "right", "vertical", "horizontal", "top", "bottom", "inner" and "outer", etc., are based on the orientations or positional relationships shown in the drawings, and are merely intended to facilitate and simplify description, rather than indicating or implying that the device or component referred to must have a specific orientation, or be constructed and operated in a specific orientation, and therefore must not be understood as limiting the disclosure.

The electric handcart provided by the present disclosure is described below in conjunction with specific embodiments.

As shown in FIGS. 1-15, an embodiment of the present disclosure provides an electric handcart, comprising: a main body 1, a power supply device 9, a motive power device and a control device.

Illustratively, as shown in FIGS. 1 to 6, in some embodiments of the present disclosure, the main body 1 comprises the motive power device and a frame on which the control device is installed; the main body 1 may also comprise multiple wheels 6 that carry the frame, preferably four or more. In some embodiments of the present disclosure, the wheels 6 may comprise two drive wheels 61 and two or more auxiliary wheels 62.

In some embodiments of the present disclosure, the electric handcart of the present disclosure can transform between a folded state and an extended state.

When the electric handcart is in the folded state, the electric handcart can be placed vertically on the ground or another surface. At this time, of the wheels 6, the drive wheels 61 are located at a lower part of the main body 1 and are in contact with the ground, while the auxiliary wheels 62 are located at an upper part of the main body 1 and are remote from the ground. In some embodiments of the present disclosure, the main body 1 further comprises a support plate 10 that extends horizontally when the electric handcart is in the folded state; together with the drive wheels 61, the support plate is configured to enable the electric handcart to be placed vertically on the ground or another surface. The support plate 10 can be used to assist in fixing the loaded goods when the electric handcart is in an unfolded state.

Figure 1:
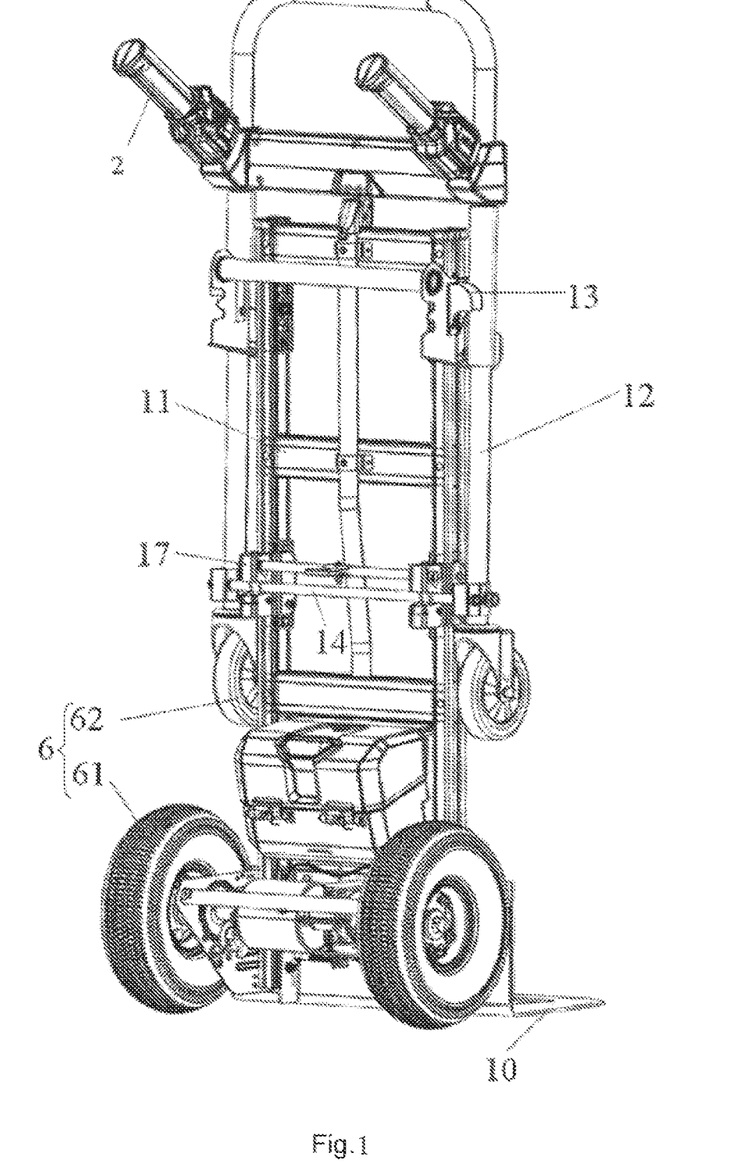
FIG. 1 is a three-dimensional drawing of an electric handcart according to some embodiments of the present disclosure.
Figure 2:
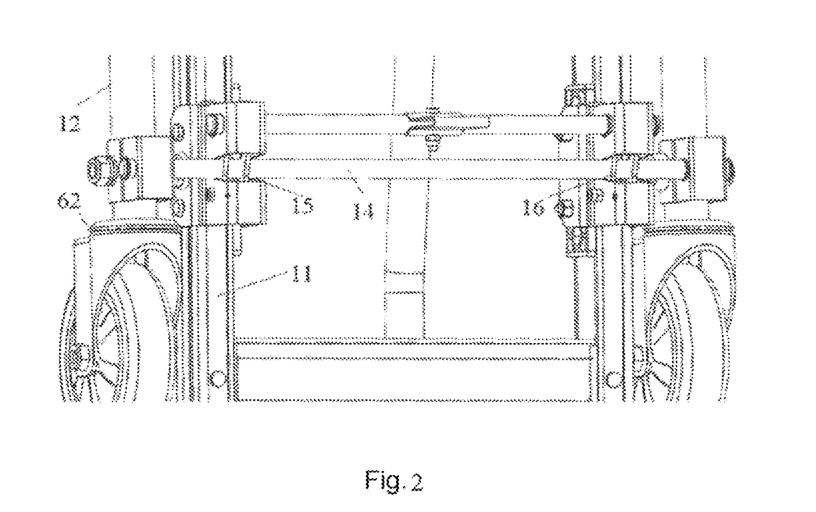
FIG. 2 is a partial enlarged view of a three-dimensional drawing of an electric handcart according to some embodiments of the present disclosure.
Figure 3:
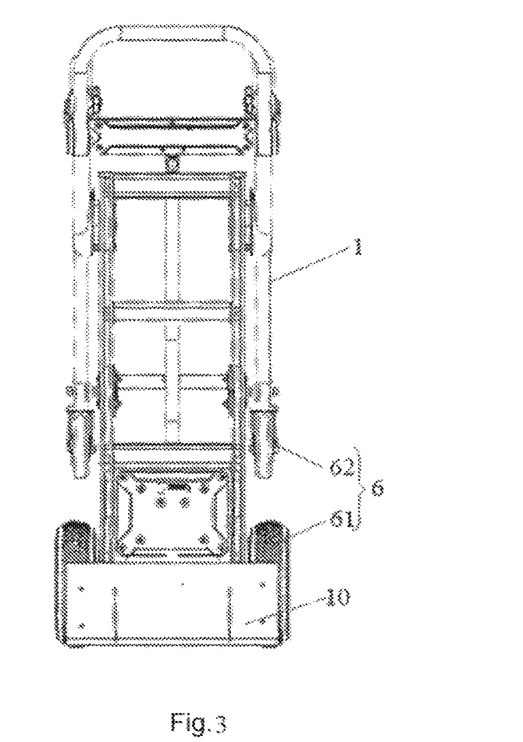
FIG. 3 is a main view of an electric handcart according to some embodiments of the present disclosure.

Illustratively, as shown in FIGS. 1 to 2, when the electric handcart is in the folded state, a main frame 11 of the main body 1 is in a vertical, upright state, and an auxiliary frame 12 provided with the auxiliary wheels 62 and a handle 2 is also in a vertical state. The main frame 11 and the auxiliary frame 12 are connected by a connecting member 13, the connecting member 13 being in a locked state. A fixing shaft 14 for engaging with the main frame 11 is provided on the auxiliary frame 12. A receiving and fixing device for receiving and fixing the auxiliary frame 12 is provided on the main frame 11, the receiving and fixing device being fitted to the fixing shaft 14. The receiving and fixing device comprises an engagement slot 15, a one-way snap-fit connector 16 arranged in the engagement slot 15, and an unlocking device 17 connected to the one-way snap-fit connector 16. Thus, the fixing shaft 14 is engaged in the engagement slot 15, and the fixing shaft 14 engaged in the engagement slot 15 is limited in the engagement slot 15 by the one-way snap-fit connector 16, thereby preventing the electric handcart from opening accidentally.

When the electric handcart in the folded state is switched to the extended state, the operator can first of all loosen the connecting member 13, then open the one-way snap-fit connector 16 by pressing the unlocking device 17, pull out the fixing shaft 14 engaged in the engagement slot 15, and thereby pull out the auxiliary frame 12. At this time, the connecting member 13 slides downward along the auxiliary frame 12, driving the main frame 11 to extend, and finally causing the auxiliary wheels 62 and the drive wheels 61 to be in contact with the ground simultaneously; the auxiliary frame 12 is upright on the ground, and the main frame 11 is parallel to the ground. The connecting member 13 is then locked, to prevent accidental folding of the electric handcart, and the main frame 11 is then used to load goods.

In some embodiments of the present disclosure, the motive power device comprises a driving device 3, a transmission device 4, a clutch device 5 and a braking device 7. It can be seen from the following that the above-mentioned devices can share some of their structure. Therefore, the present disclosure is not intended to limit the above-mentioned devices to being completely independent parts.

Preferably, a braking device 7 is provided for each drive wheel 61, in order to achieve a better braking effect. However, it is also possible to provide a corresponding braking device 7 for only one or more of the drive wheels 61. As can be seen from FIGS. 7 and 8 (in FIG. 8, in order to show one braking device 7 more clearly, other non-relevant components have been omitted), the braking device 7 comprises a brake disk 75 installed on an axle, a braking part 74 which is coupled to the brake disk 75 and able to perform a braking action thereon, a brake/clutch motor 71, a cam 72 connected to an output shaft of the brake/clutch motor, and a brake line 73 connected between the braking part 74 and the brake/clutch motor 71. Thus, when the brake/clutch motor 71 receives a braking signal and is thereby actuated in a first direction, the cam 72 pulls the brake line 73; the brake line 73 then drives the braking part 74 to act on the brake disk 75, thereby braking the drive wheel 61. If multiple braking devices 7 are present, it is still possible to use only one brake/clutch motor 71 to drive multiple brake lines 73 simultaneously.

Figure 9:
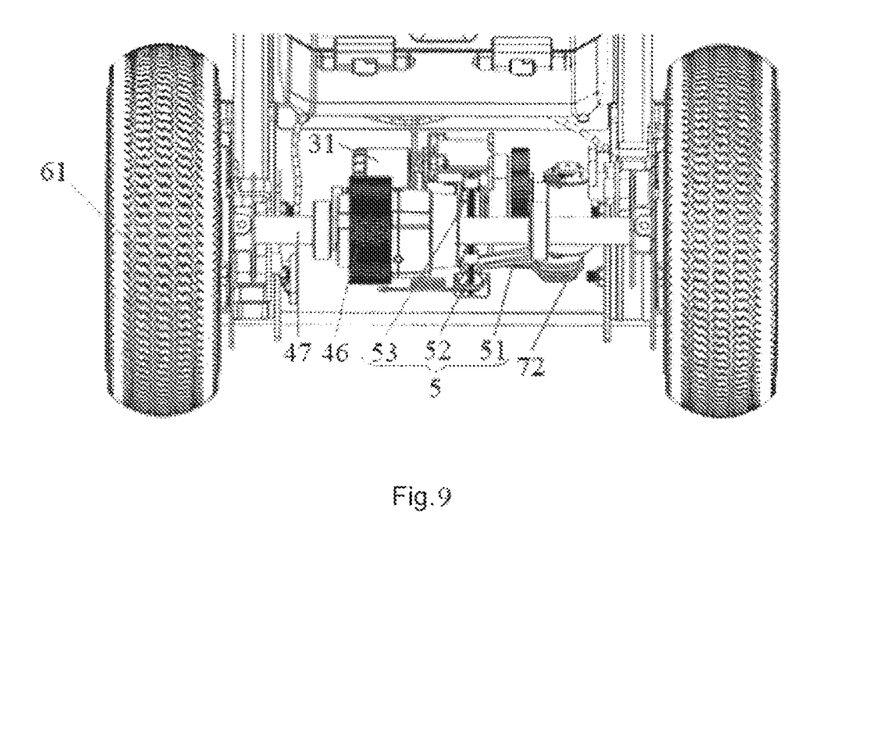
FIG. 9 is a partial enlarged view of the interior of an electric handcart according to some embodiments of the present disclosure.
Figure 10:
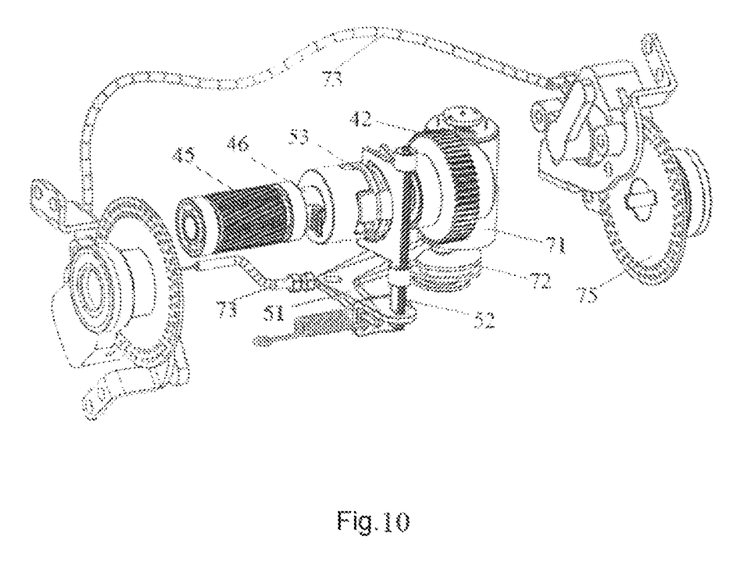
FIG. 10 is a second partial structural schematic drawing of an electric handcart according to some embodiments of the present disclosure.

As shown in FIGS. 9 and 10 (in FIG. 10, in order to show the structure of the clutch device 5 more clearly, some other non-relevant components have been omitted), in some embodiments of the present disclosure, the clutch device 5 comprises a clutch control rod 51 having one end connected to the cam 72 in the braking device 7, a clutch driving lever 52 pivotably connected to the other end of the clutch control rod 51, and a clutch body 53 joined to the clutch driving lever 52, the clutch body 53 being connected to the transmission device 4. Thus, when the brake/clutch motor 71 receives the braking signal and is thereby actuated in the first direction, it can not only pull the brake line 73 via the cam 72 in order to brake the drive wheel 61, but can also, via the cam 72, pull the clutch control rod 51 connected thereto to move, such that the clutch driving lever 52 pivotably connected to the clutch control rod 51 drives a component of the clutch body 53 to rotate, thus disconnecting the clutch body 53, so that the transmission of motive power to the drive wheel 61 by a drive motor 31 is disconnected, thus controlling the clutch device at the same time as braking is performed.

It must be added that in the process of the braking device 7 and the clutch device 5 being driven by means of the brake/clutch motor 71, braking of the drive wheel 61 is preferably performed at the same time as, or after, the clutch body 53 is disconnected in the present disclosure, in order to achieve the optimal braking effect while reducing the braking loss of the electric handcart.

Optionally, in some embodiments of the present disclosure, the transmission device 4 is preferably a differential transmission device. Configuring the transmission device 4 as a differential transmission device can not only reduce the volume of the transmission device 4 and lighten the weight of the transmission device 4, but can also achieve a difference in speed between inner and outer wheels when the electric handcart is turning, thereby achieving smooth turning. In addition, differential transmission devices also have advantages such as a large range of transmission ratios and high efficiency, so can effectively improve the operating performance of the electric handcart.

Figure 11:
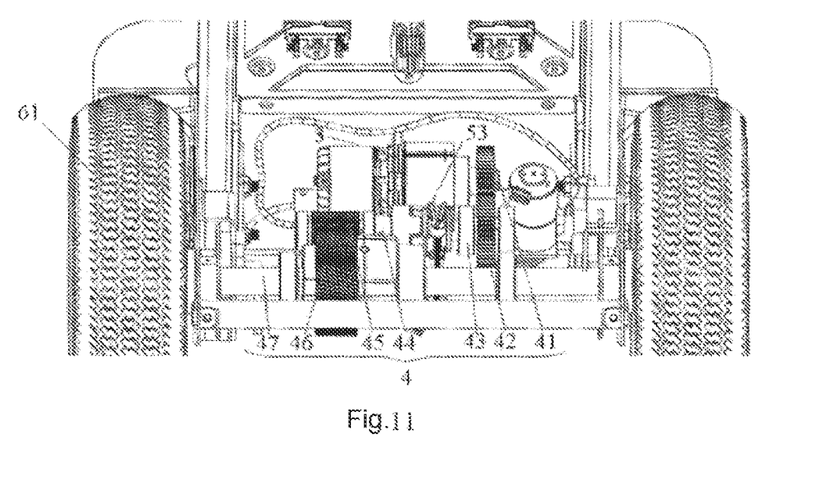
FIG. 11 is a partial oblique enlarged view of the interior of an electric handcart according to some embodiments of the present disclosure.
Figure 12:
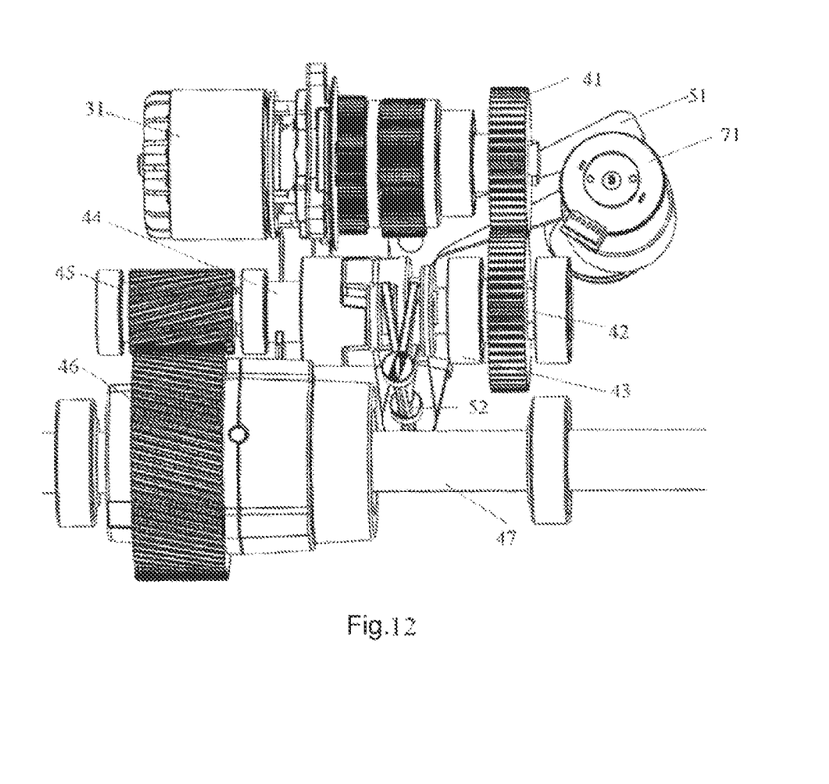
FIG. 12 is a third partial structural schematic drawing of an electric handcart according to some embodiments of the present disclosure.

Optionally, as shown in FIGS. 11 and 12 (in FIG. 12, in order to show the structure of the transmission device 4 more clearly, other non-relevant components have been omitted), the differential transmission device comprises a first-stage transmission gear 41, a second-stage transmission gear 42, a first rotation shaft 43, a second rotation shaft 44, a third-stage transmission gear 45, a fourth-stage transmission gear 46, and a drive shaft 47.

Specifically, the first-stage transmission gear 41 is connected to the drive motor 31 in the driving part 3; moreover, the first-stage transmission gear 41 is meshed with the second-stage transmission gear 42, the second-stage transmission gear 42 is installed at one end of the first rotation shaft 43, the other end of the first rotation shaft 43 is connected to one end of the second rotation shaft 44 via the clutch device 5 (the clutch body 53 in the clutch device 5), the third-stage transmission gear 45 is mounted on the other end of the second rotation shaft 44, the third-stage transmission gear 45 is meshed with the fourth-stage transmission gear 46, and the fourth-stage transmission gear 46 is mounted on the drive shaft 47, wherein the drive wheels 61 are mounted on the two ends of the drive shaft 47 respectively.

Thus, when the power supply is switched on and the electric handcart is in an electrically powered mode, the drive motor 31 is activated; the drive motor 31 drives the first-stage transmission gear 41 to rotate, and transmits motive power to the drive shaft 47 via the second-stage transmission gear 42 meshed with the first-stage transmission gear, the first rotation shaft 43, the clutch body 53 connecting the first rotation shaft 43 and second rotation shaft 44, the second rotation shaft 44, the third-stage transmission gear 45, and the fourth-stage transmission gear 46 meshed with the third-stage transmission gear, such that the drive wheels 61 mounted on the two ends of the drive shaft 47 are driven to move by means of the drive shaft 47, thus enabling the electric handcart to move.

Illustratively, in some embodiments of the present disclosure, the transmission ratio of the differential transmission part can be 1:3.

Figure 4:
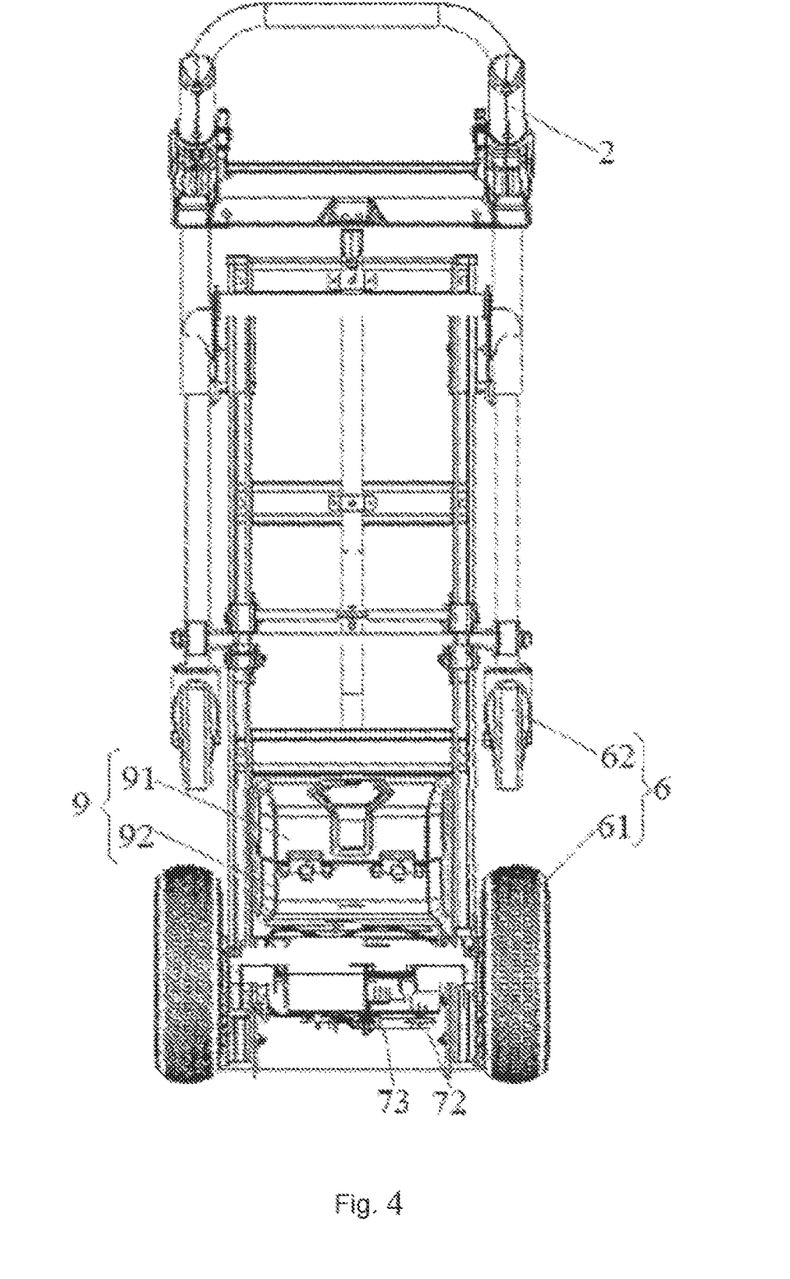
FIG. 4 is a rear view of an electric handcart according to some embodiments of the present disclosure.
Figure 5:
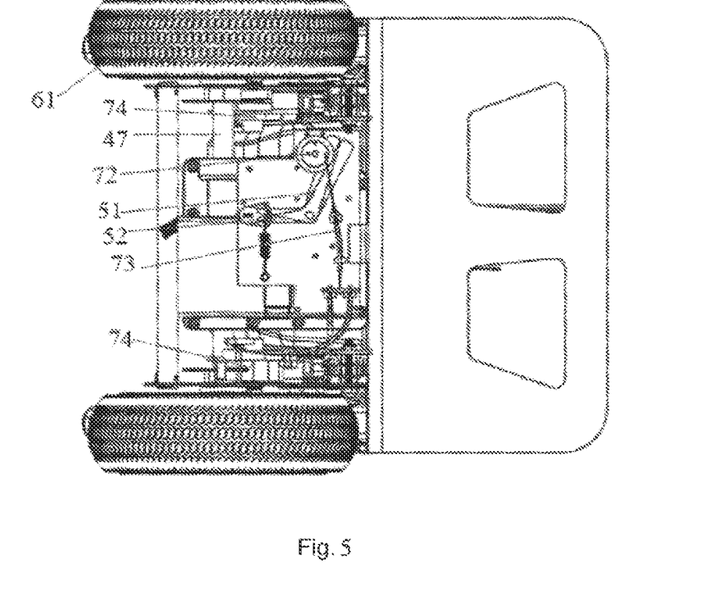
FIG. 5 is a bottom view of an electric handcart according to some embodiments of the present disclosure.
Figure 13:
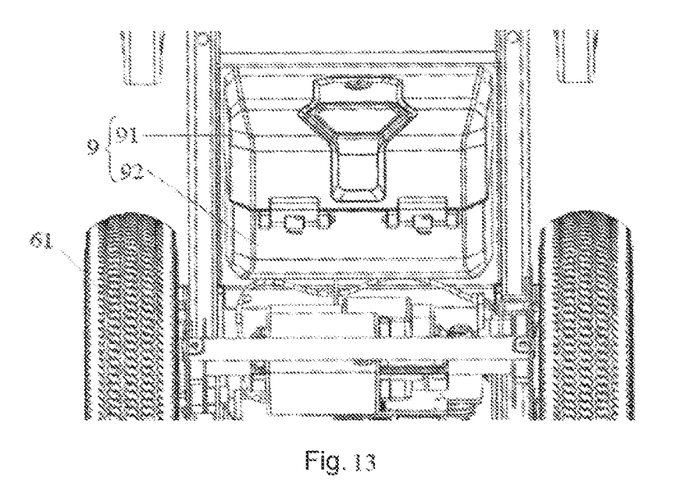
FIG. 13 is a partial enlarged view of a battery device of an electric handcart according to some embodiments of the present disclosure.

In some embodiments of the present disclosure, as shown in FIGS. 4 and 13, the power supply device 9 is installed on the main frame 11 of the main body 1; the power supply device 9 is separately connected to the driving device 3 and the braking device 7, and supplies electrical energy to the drive motor 31 in the driving device 3 and the brake/clutch motor 71 in the braking device 7.

Of course, in other embodiments, an external plug can also be provided on the main body 1 of the electric handcart, and the electric handcart can be powered by an external power source.

Optionally, as shown in FIGS. 4 and 13, the power supply device 9 comprises an upper housing 91 and a lower housing 92 which are detachably connected to each other, wherein only the lower housing 91 is mounted on the main body 1 in a fixed manner; a battery in the power supply device 9 is arranged in a cavity formed by the upper housing and the lower housing, and may be a storage battery, etc. Thus, when it is necessary to overhaul or replace the battery in the power supply device 9, a worker only needs to open the upper housing 91, and can then overhaul or replace the battery, without needing to remove the entire power supply device 9.

In addition, a sealing ring is preferably provided between the lower housing 91 and the upper housing 92, in order to prevent rainwater, etc. from entering the cavity of the power supply device 9 and thereby damaging the battery. Illustratively, the sealing ring can be a rubber sealing ring of a soft material, in order to further improve the sealing of the power supply device 9.

In some embodiments of the present disclosure, the control device comprises a controller (e.g. a control circuit, etc.) for controlling the motive power device, and a switch device 8 connected to the controller. The switch device 8 can provide the function of a power supply switch in order to switch the power supply of the electric handcart on or off, the function of motor operation adjustment in order to adjust the rotation speed of the motor, and the function of activating or deactivating the braking device. In addition, the switch device 8 can also be configured to provide the function of adjustment of movement speed and/or movement direction, in order to adjust the movement speed and movement direction of the electric handcart.

When the electric handcart is being used, the power supply can be switched on and the driving device 3 and braking device 7 can be activated by means of the switch device 8 and the controller. At this time, the clutch body 53 is in the engaged state, and the motive power outputted by the driving device 3 can be transmitted to the drive wheels 61 via the transmission device 4, so as to drive the electric handcart to move, thus impelling the electric handcart to move to a designated position. After reaching the designated position, the braking function is activated by means of the switch device 8, i.e. a braking signal is sent to the braking device 7 by means of the switch device 8 and the controller. After the brake/clutch motor 71 receives the braking signal, the brake/clutch motor 71 is actuated in the first direction; the cam 72 pulls the brake line 73 in order to brake the drive wheel 61, and at the same time the cam 72 pulls the clutch control rod 51 connected thereto to move, such that the clutch driving lever 52 pivotably connected to the clutch control rod 51 drives a component of the clutch body 53 to rotate, thus disconnecting the clutch body 53. The transmission of motive power to the drive wheel 61 by the drive motor 31 is disconnected, and consequently the electric handcart stops moving. In this way, the electric handcart can be stopped by electrical braking, thus increasing the braking force and stability of the electric handcart during braking, and considerably improving the braking safety of the electric handcart when loaded with heavy goods.

It can be seen from the structure described above that the electric handcart disclosed in embodiments of the present disclosure can achieve simple switching among three operating modes: (1) Freewheel mode: when the power supply is switched off, neither the driving device 3 nor the braking device 7 is operational; the electric handcart can be pushed freely, and is thus in a traditional manually driven state. (2) Electrically powered mode: the power supply is switched on, and the drive motor 31 in the driving device 3 and the brake/clutch motor 71 in the braking device 7 are activated by means of the switch device 8 and the controller, but at this time the brake/clutch motor 71 has not received a braking signal, the braking part 74 does not act on the brake disk 75, the clutch body 53 in the clutch device 5 is in the engaged state, and motive power outputted by the drive motor 31 is transferred to the drive wheels 61 via the clutch body 53 and the transmission device 4, thus driving the electric handcart to move. (3) Braking mode: a braking signal is sent to the brake/clutch motor 71 by means of the switch device 8 and the controller; after receiving the braking signal, the brake/clutch motor 71 is actuated in the first direction; the cam 72 pulls the brake line 73, and the brake line 73 then drives the braking part 74 to act on the brake disk 75, thereby braking the drive wheel 61; at the same time, the cam 72 pulls the clutch control rod 51 connected thereto to move, and the clutch control rod 51 drives the clutch driving lever 52 pivotably connected thereto to move, causing a component of the clutch body 53 to rotate, and the clutch is disconnected; thus, the clutch device is controlled at the same time as braking is performed.

It must be added that the controller may comprise a processor for supporting the control device in switching the operating modes of the electric handcart, and a storage unit for storing program code of the control device, etc. Illustratively, the processor may be a central processing unit (CPU), but may also be another general-purpose processor, digital signal processor (DSP), application-specific integrated circuit (ASIC), field programmable gate array (FPGA) or another programmable logic device, etc. The general-purpose processor may be a microprocessor or any conventional processor, etc.

Figure 6:
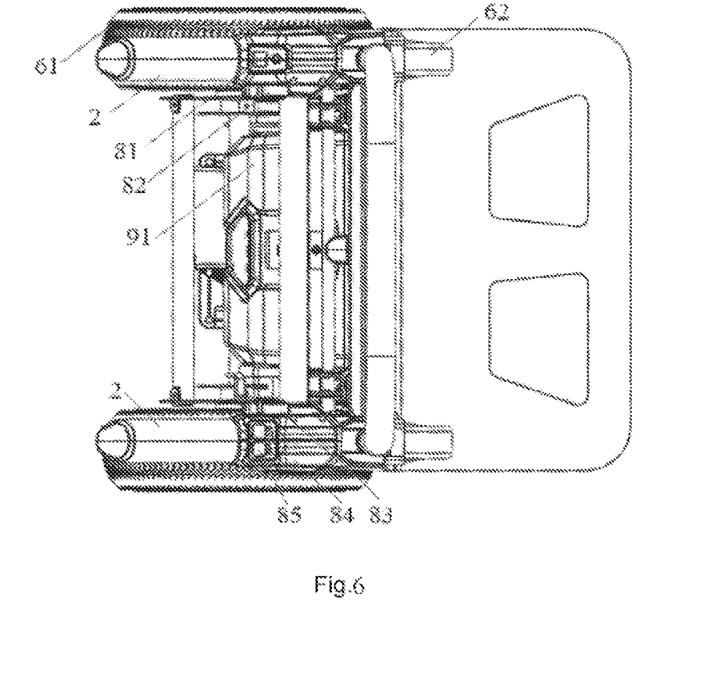
FIG. 6 is a top view of an electric handcart according to some embodiments of the present disclosure.
Figure 7:
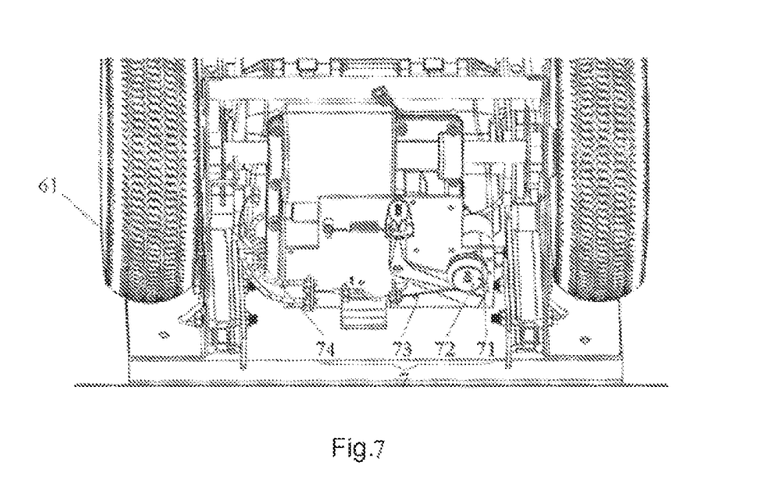
FIG. 7 is a partial enlarged view of the bottom of an electric handcart according to some embodiments of the present disclosure.
Figure 8:
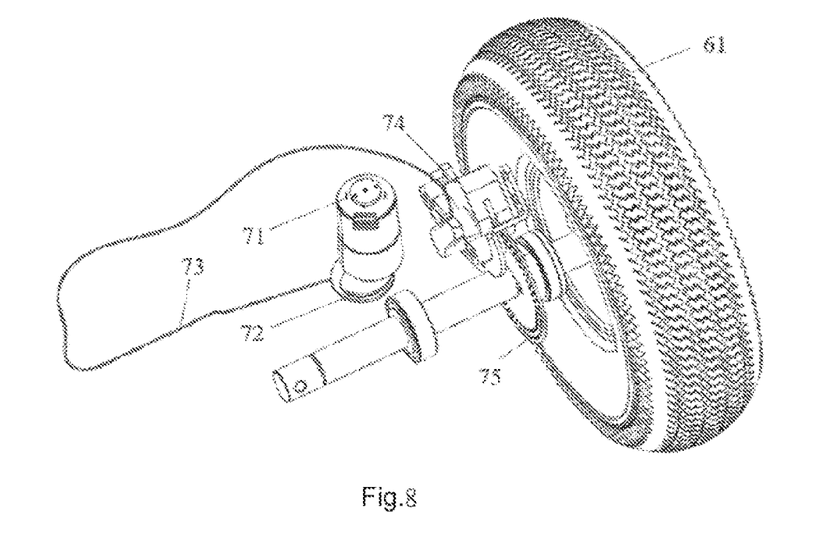
FIG. 8 is a first partial structural schematic drawing of an electric handcart according to some embodiments of the present disclosure.
Figure 14:
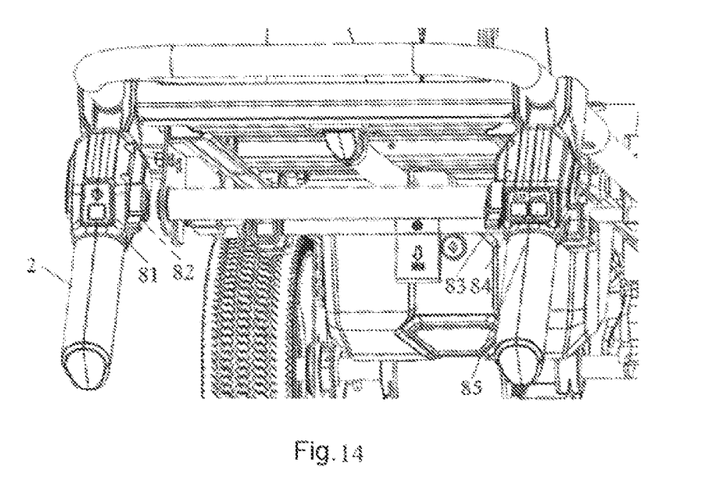
FIG. 14 is a partial enlarged view of a handle of an electric handcart according to some embodiments of the present disclosure.
Figure 15:
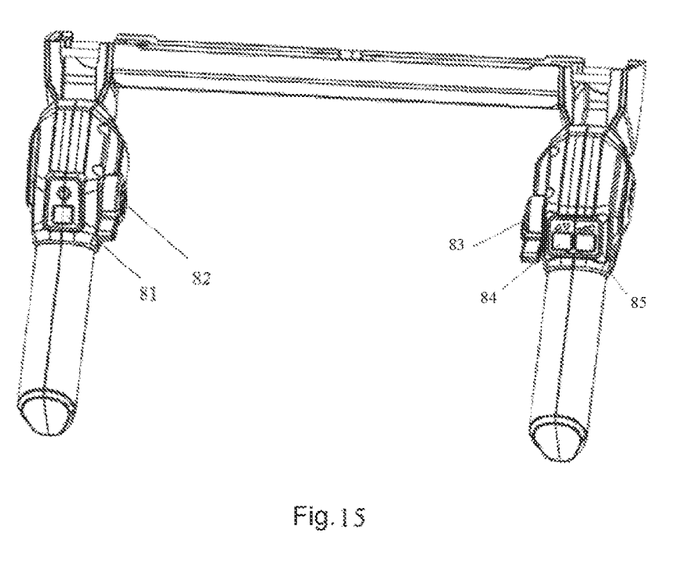
FIG. 15 is a schematic structural drawing of a handle of an electric handcart according to some embodiments of the present disclosure.

Optionally, as shown in FIGS. 6 and 14-15, in some embodiments of the present disclosure, the switch device 8 may comprise: a power supply membrane switch 81 for controlling the switching of the power supply of the electric handcart on or off, a brake switch 82, a motor adjustment switch 83 for adjusting motor operation when the power supply is switched on, a direction adjustment membrane switch 84 for controlling the advance or retreat of the electric handcart, and a speed adjustment membrane switch 85 for adjusting the movement speed of the electric handcart.

Illustratively, when it is necessary to switch the electric handcart from the freewheel mode to the electrically powered mode, the operator can turn on the power supply membrane switch 81 and the motor adjustment switch 83, and activate the drive motor 31 and the brake/clutch motor 71; at this time, the brake/clutch motor 71 has not received a braking signal, so the braking part 74 does not operate, and the drive motor 31 transmits motive power to the transmission device 4. The motive power is transmitted to the drive wheels 61 via the transmission device 4 and the engaged clutch body 53, thus driving the electric handcart to move.

Illustratively, as the electric handcart moves under electrical power, the user can, as required, adjust the movement speed of the electric handcart by means of the motor adjustment switch 83 and the speed adjustment membrane switch 85 together, and at the same time can also make the electric handcart advance or retreat by means of the direction adjustment membrane switch 84.

When the electric handcart reaches a target position and it is necessary to stop the electric handcart moving under electrical power, the user can press the brake switch 82. A braking signal is sent to the brake/clutch motor 71 by means of the controller; after the brake/clutch motor 71 receives the braking signal, motive power is transmitted to the cam 72; under the action of the cam 72, the brake line 73 drives the braking part 74 to act, while the clutch control rod 51 drives the clutch driving lever 52 pivotably connected thereto to move, such that a component of the clutch body 53 rotates, and the clutch is disconnected, so that the handcart is braked, stops moving, and is unable to be pushed. After switching off the power supply by means of the power supply membrane switch 81, the user can safely unload the goods from the electric handcart.

In addition, the switch device 8 can be arranged on the handle 2, so that a worker can conveniently operate it at any time while using the electric handcart.

Preferably, the switch device 8 can be arranged on a gripping part of the handle 2, to further facilitate operation by the worker.

Illustratively, as shown in FIGS. 6 and 14-15, in some embodiments of the present disclosure, the power supply membrane switch 81 is arranged on an end face of a first end of the handle 2, the brake switch 82 is arranged on an inner side of the first end, the motor adjustment switch 83 is arranged on an inner side of a second end of the handle 2, and the direction adjustment membrane switch 84 and speed adjustment membrane switch 85 are arranged on an end face of the second end. Thus, while using the electric handcart, a worker can turn each switch on or off at any time as required, for convenience of operation. In the description of the foregoing embodiments, specific features, structures, materials or characteristics may be combined in any one or more embodiments or examples in a suitable manner.

The above are merely specific embodiments of the present disclosure, but the scope of protection of the present disclosure is not limited to this. All changes or substitutions conceived by any person skilled in the art within the technical scope disclosed herein should be included in the scope of protection of the present disclosure. Therefore, the scope of protection of the present disclosure should be subject to the scope of protection of the claims.

The invention claimed is:

1. An electric handcart, comprising: a main body, a power supply device mounted on the main body, a motive power device and a control device, the power supply device and the control device being separately connected to the motive power device
  wherein the main body comprises a frame on which the power supply device, the motive power device and the control device are mounted, and multiple wheels which carry the frame,
  wherein the motive power device comprises a driving device, a transmission device connected to the driving device, a clutch device connected to the transmission device, and a braking device; the wheels are separately connected to the transmission device and the braking device, and the control device is separately connected to the driving device and the braking device, and
  wherein the braking device comprises a brake/clutch motor, a cam, a brake line, a braking part, and a brake disk which acts on at least one of the wheels; an output shaft of the brake/clutch motor is connected to the cam, the cam is connected to the braking part via the brake line, and the clutch device is connected to the cam.

2. The electric handcart as claimed in claim 1, wherein the clutch device comprises a clutch control rod, a clutch driving lever and a clutch body; one end of the clutch control rod is connected to the cam, the other end of the clutch control rod is connected to one end of the clutch driving lever, the other end of the clutch driving lever is connected to the clutch body, and the clutch body is connected to the transmission device.

3. The electric handcart as claimed in claim 1, wherein the transmission device is a differential transmission device.

4. The electric handcart as claimed in claim 3, wherein the differential transmission device comprises a first-stage transmission gear connected to a drive motor in the driving device, a second-stage transmission gear meshed with the first-stage transmission gear, a first rotation shaft with the second-stage transmission gear mounted on one end thereof, a second rotation shaft with one end connected to the other end of the first rotation shaft via the clutch device, a third-stage transmission gear mounted on the other end of the second rotation shaft, a fourth-stage transmission gear meshed with the third-stage transmission gear, and a drive shaft on which the fourth-stage transmission gear is mounted; wherein the wheels are mounted on two ends of the drive shaft respectively.

5. The electric handcart as claimed in claim 4, wherein the transmission ratio of the differential transmission device is 1:3.

6. The electric handcart as claimed in claim 3, wherein the transmission ratio of the differential transmission device is 1:3.

7. The electric handcart as claimed in claim 1, wherein the power supply device comprises an upper housing and a lower housing; the lower housing is mounted on the main body in a fixed manner, and the upper housing is detachably connected to the lower housing.

8. The electric handcart as claimed in claim 7, wherein a sealing ring is provided between the lower housing and the upper housing.

9. The electric handcart as claimed in claim 1, wherein the control device comprises a controller for controlling the motive power device, and a switch device connected to the controller.

10. The electric handcart as claimed in claim 9, wherein the switch device comprises: a power supply membrane switch for controlling the switching of a power supply of the electric handcart on or off, a brake switch, a motor adjustment switch for adjusting motor operation when the power supply is switched on, a direction adjustment membrane switch for controlling the advance or retreat of the electric handcart, and a speed adjustment membrane switch for adjusting the movement speed of the electric handcart.

11. The electric handcart as claimed in claim 10, wherein a handle is provided on the main body, and the switch device is arranged on the handle.

12. The electric handcart as claimed in claim 11, wherein the power supply membrane switch is arranged on an end face of a first end of the handle, the brake switch is arranged on an inner side of the first end, the motor adjustment switch is arranged on an inner side of a second end of the handle, and the direction adjustment membrane switch and the speed adjustment membrane switch are arranged on an end face of the second end.

13. The electric handcart as claimed in claim 1, wherein the electric handcart can switch between three operating modes, the three operating modes comprising a freewheel mode, an electrically powered mode, and a braking mode.

14. The electric handcart as claimed in claim 1, wherein the electric handcart is alternatable between a folded state and an extended state.

15. An electric handcart, comprising:
  a main body, a power supply device mounted on the main body, a motive power device and a control device, wherein the main body comprises a frame on which the power supply device, the motive power device and the control device are mounted, and multiple wheels which carry the frame,
  wherein the motive power device comprises a driving device and a braking device, and the power supply device is separately connected to the driving device and the braking device, and
  wherein the power supply device supplies electrical energy to the driving device and the braking device.

16. The electric handcart as claimed in claim 15, wherein the control device comprises a controller and a switch device connected to the controller, and wherein the driving device and the braking device can be activated by the switch device and the controller.

17. The electric handcart as claimed in claim 15, wherein the electric handcart can switch between three operating modes, the three operating modes comprising a freewheel mode, an electrically powered mode, and a braking mode.

18. The electric handcart as claimed in claim 15, wherein the electric handcart is alternatable between a folded state and an extended state.

19. The electric handcart as claimed in claim 15, wherein the braking device comprises a brake/clutch motor, a cam, a brake line, a braking part, and a brake disk which acts on at least one of the wheels; an output shaft of the brake/clutch motor is connected to the cam, the cam is connected to the braking part via the brake line, and the clutch device is connected to the cam.

\* \* \* \* \*